United States Patent
Tam et al.

(10) Patent No.: US 6,710,295 B1
(45) Date of Patent: Mar. 23, 2004

(54) SLIDER CURVATURE MODIFICATION BY SUBSTRATE MELTING EFFECT PRODUCED WITH A PULSED LASER BEAM

(75) Inventors: Andrew Ching Tam, Saratoga, CA (US); Chie Ching Poon, San Jose, CA (US); Ping-Wei Chang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 722 days.

(21) Appl. No.: 09/594,979

(22) Filed: Jun. 15, 2000

(51) Int. Cl.[7] .................................. B23K 26/00
(52) U.S. Cl. .................. 219/121.85; 219/121.69
(58) Field of Search ................. 219/121.85, 121.69, 219/121.67, 121.68

(56) References Cited

U.S. PATENT DOCUMENTS

| | | | |
|---|---|---|---|
| 4,301,353 A | 11/1981 | Suenaga et al. | |
| 4,894,740 A | 1/1990 | Chhabra et al. | |
| 4,910,621 A | 3/1990 | Matsuda et al. | |
| 4,912,883 A | 4/1990 | Chang et al. | |
| 4,914,868 A | 4/1990 | Church et al. | |
| 5,220,471 A | 6/1993 | Matsuzaki | |
| 5,237,476 A | 8/1993 | Bischoff et al. | |
| 5,256,850 A | 10/1993 | Maegawa et al. | |
| 5,266,769 A | 11/1993 | Deshpande et al. | |
| 5,303,105 A | 4/1994 | Jorgenson | |
| 5,442,850 A | 8/1995 | Kerth | |
| 5,462,636 A | 10/1995 | Chen et al. | |
| 5,544,775 A * | 8/1996 | Kerth et al. .................. 216/65 |
| 5,650,893 A | 7/1997 | Bolasna et al. | |
| 5,687,042 A | 11/1997 | Chhabra et al. | |
| 5,704,112 A | 1/1998 | Katase et al. | |
| 5,713,123 A | 2/1998 | Toyoda et al. | |
| 5,739,048 A | 4/1998 | Kerth et al. | |
| 5,820,770 A | 10/1998 | Cohen et al. | |
| 5,982,583 A * | 11/1999 | Strom ...................... 360/234.3 |
| 6,108,170 A * | 8/2000 | Crawforth et al. ....... 360/234.3 |
| 6,288,873 B1 * | 9/2001 | Lundquist et al. ........ 360/234.6 |
| 6,321,440 B1 * | 11/2001 | Crawforth et al. ......... 29/603.1 |
| 6,548,009 B1 * | 4/2003 | Khlif et al. ................ 264/400 |

FOREIGN PATENT DOCUMENTS

| | | |
|---|---|---|
| JP | 58-189869 | 11/1983 |
| JP | 62-6475 | 1/1987 |
| JP | 63-149812 | 6/1988 |
| JP | 63-95343 | 10/1989 |
| JP | 3-70907 | 10/1992 |
| JP | 3-168324 | 1/1993 |
| JP | 3-264485 | 9/1994 |
| JP | 6091958 | 11/1995 |
| JP | 07139887 | 11/1996 |
| JP | 07155715 | 1/1997 |
| JP | 08042037 | 8/1997 |

* cited by examiner

*Primary Examiner*—M. Alexandra Elve
(74) *Attorney, Agent, or Firm*—Larry B. Guernsey; IPLO Intellectual Property Law Offices

(57) ABSTRACT

A method and apparatus for producing very high crown and camber curvature in slider materials using a laser processing system which produces fluence which is variable in a controllable manner, by applying a laser beam to the flex side of the slider material and varying the fluence of the laser beam to optimize the curvature in the slider material. The fluence is variable by finely controlling the power output of the laser or by changing the spot size of the laser beam. The beam spot size can be changed by using a focusing lens to establish a focal plane and then varying the relative positions of the slider relative and the focal plane. An apparatus for producing high crown and camber is also disclosed, as well as a slider produced by the process of applying a laser beam to the flex side of the slider material and varying the fluence of the laser beam to optimize the curvature in the slider material.

19 Claims, 7 Drawing Sheets

$$C = \frac{3}{4} \frac{(1-\nu)}{E} \left(\frac{L}{a}\right)^2 (\Delta S \times b)$$

ΔS  stress change
E   Young's modulus
ν   Poisson's ratio

SLIDER CURVATURE MODIFICATION BY SUBSTRATE MELTING EFFECT PRODUCED WITH A PULSED LASER BEAM

CROSS-REFERENCE TO RELATED APPLICATIONS

Reference is made to U.S. patent application Ser. No. 09/444,793, filed Nov. 22, 1999, entitled PROCESSING OF MULTI-PHASE CERAMIC SLIDER MATERIALS USING HARMONICALLY GENERATED ULTRAVIOLET LASER RADIATION in the names of Paul M. Lundquist, et. al.

BACKGROUND OF THE INVENTION

1. Field of the Invention

The present invention relates to an improved method for the manufacture of sliders for disk drives. More particularly, the invention relates to a method for controllably producing very high crown and camber in the air bearing surface of a slider by applying pulsed laser energy in accordance with the method of the present invention to the back side of the slider in order to induce stress, and thus curvature in the slider material.

2. Description of the Background Art

Magnetic storage disk drives typically include a magnetic sensor called a "head" suspended in close proximity to the magnetic disk, which serves as the recording medium. In Winchester-type disk drives, a magnetic thin film head is embedded in a ceramic block, called a slider, which is then attached to a flexible suspension. During operation, the rotation of the magnetic disk relative to the slider provides an air-flow along the surface of the slider, which causes it to lift, so that the slider is supported on a cushion of air. This surface of the slider is referred to as the Air Bearing Surface (ABS) and its separation from the disk the Fly Height (FH). The shape of the slider and of the ABS in particular is crucial to the performance of the head. Contours in the ABS establish the desired pressure gradients for positioning the slider above the disk surface. It is therefore typically necessary to form complex contours in the shape of the slider by micro-machining, etching, or other processes to obtain the desired performance.

As more is learned about the dynamics of flying heads, more subtle changes are being required in the shape of the ABS. To implement these refinements, it is becoming more and more desirable to create contours which are complex in three dimensions. Two parameters pertaining to the curvature or flatness of the ABS that are considered important are "crown" and "camber". Crown is the maximum separation of the cylindrical contour along the flying direction from an imaginary plane drawn between the two end edges, i.e., the leading and trailing edges, of the ABS. Camber has a similar definition and is the separation from an imaginary plane drawn between the two side edges of the slider. For the modern "pico" sliders, these curvature parameters are typically on the order of several nanometers (nm), while the slider width and length are about 1 mm. The curvatures of the ABS are therefore truly minute, however, the variance of the crown and camber of modern sliders remains to be a key factor for the slider performance. Hence, there is an obvious need to develop and implement a method to finely adjust crown and camber.

A variety of techniques are currently being practiced for controlling the slider curvature beyond the capability of conventional lapping. All these techniques rely on inducing a surface stress change ($\Delta S$) on at least one slider surface. This change of surface stress can be (1) positive (i.e., increase of compressive stress) or (2) negative (i.e., decrease of compressive stress). The change in surface stress produces a curvature change in the slider, as shown in FIGS. 1A and 1B. FIG. 1A shows surface layers having residual compressive stresses in the shaded areas. In FIG. 1B, the surface residual stress on the top surface, assumed to be the flex side, (also called the back side) has been reduced by $\Delta S$, while on the bottom (ABS) side, the residual compressive stress is unchanged. If only one surface is stress-modified by $\Delta S$, this surface will become more convex or concave if $\Delta S$ is positive or negative, respectively. This effect is easy to visualize if the original surface is exactly flat, as shown in FIG. 1A. In this case, the crown change C (which is the "bulging" of the slider ABS as viewed from the y-direction) is simply given by:

$$C=[3(1-v)/4E](L/a)^2 (\Delta S \times b)$$

where L is the length of the slider, a is its thickness, b is the depth of the surface stress layer, v is Poisson's ratio, and E is Young's modulus. The camber change is also given by a similar equation for the "bulging" of the slider as viewed from the x-direction.

Several techniques for producing positive or negative stress changes on a slider surface are known. Techniques to induce negative stress changes (i.e., reducing the existing compressive stress, or inducing tensile stress on the surface) are usually practiced on the flex side of the slider, in order to produce an increase in the crown or camber at the ABS side. Stress-reducing techniques that can be used at the flex side include "kiss-lapping" or plasma etching, which can remove part or all of the stressed layer on the surface. However, such processes have characteristics which detract from their use in a commercial environment.

A more recent approach to slider shaping is the use of laser scribing. Using a laser for creating curvature in sliders is found in U.S. Pat. No. 5,982,583 to Strom. It states in claim 1 the use of a laser to melt and then cool the back surface (here referred to as the flex side) of a slider to add tensile stress which causes tensile stress relief cracks in the back surface, and which causes the air bearing surface to curve thus modifying crown or camber. Strom's tensile stress relief cracks are oriented predominately parallel to the crown curvature axis. The present inventors regard cracks as undesirable, and should be reduced or minimized in number and size so as not to worsen the surface integrity. The presence of such tensile stress cracks as required by the prior art is an indication that excessive laser power is used to melt excessive amounts of material, and such excessive laser power may damage the sensor which is embedded in the ceramic slider material.

Although some presence of micro-cracks are inevitable when the surface is made "tensile", preferably any cracks made by laser processing should be only very microscopic micro-cracks, visible with a Scanning Electron Microscope. Such micro-cracks tend to orient randomly. An improved approach therefore is to minimize any tensile stress cracks.

Consequently, there is a need for an improved method of laser processing of sliders which does not require the introduction of tensile stress relief cracks in slider material.

It is, therefore, an object of the present invention to provide an improved method for creating controllable crown and camber in sliders by using pulsed laser energy in accordance with the present invention to produce specific, controllable minute curvatures, without the required introduction of tensile stress relief cracks. Other objects and advantages will become apparent from the following disclosure.

SUMMARY OF THE INVENTION

The present invention relates to a method and apparatus for producing very high crown and camber curvature in slider materials using a laser processing system which produces fluence, which is variable in a controllable manner, by applying a laser beam to the flex side of the slider material and varying the fluence of the laser beam to form the curvature in the slider material.

A more thorough disclosure of the present invention is presented in the detailed description which follows and the accompanying figures.

BRIEF DESCRIPTION OF THE DRAWINGS

The objects and, advantages and features of the present invention will be more clearly understood by reference to the following detailed disclosure and the accompanying drawings in which.

DETAILED DESCRIPTION OF THE INVENTION

Figure 1A:
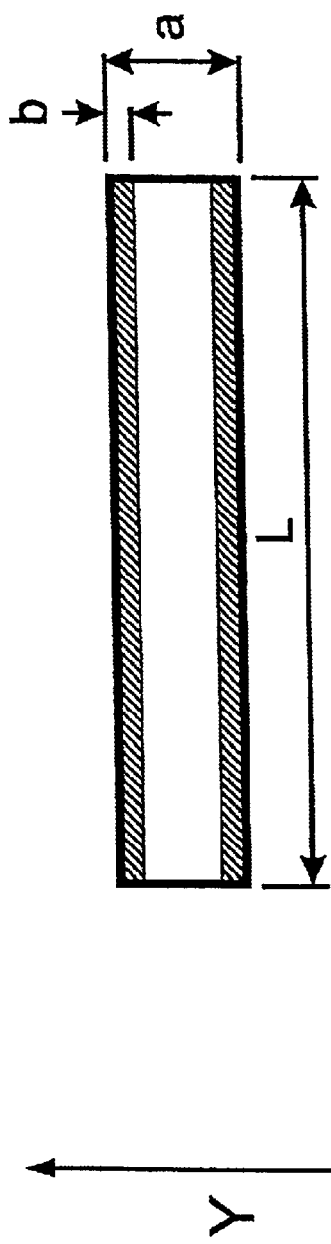
FIGS. 1A & B show a side plan view of a block of slider material first with unrelieved compressive stress on both surfaces, and then showing the effect of relief of compressive stress on the upper surface, and the resulting curvature produced.
Figure 1B:
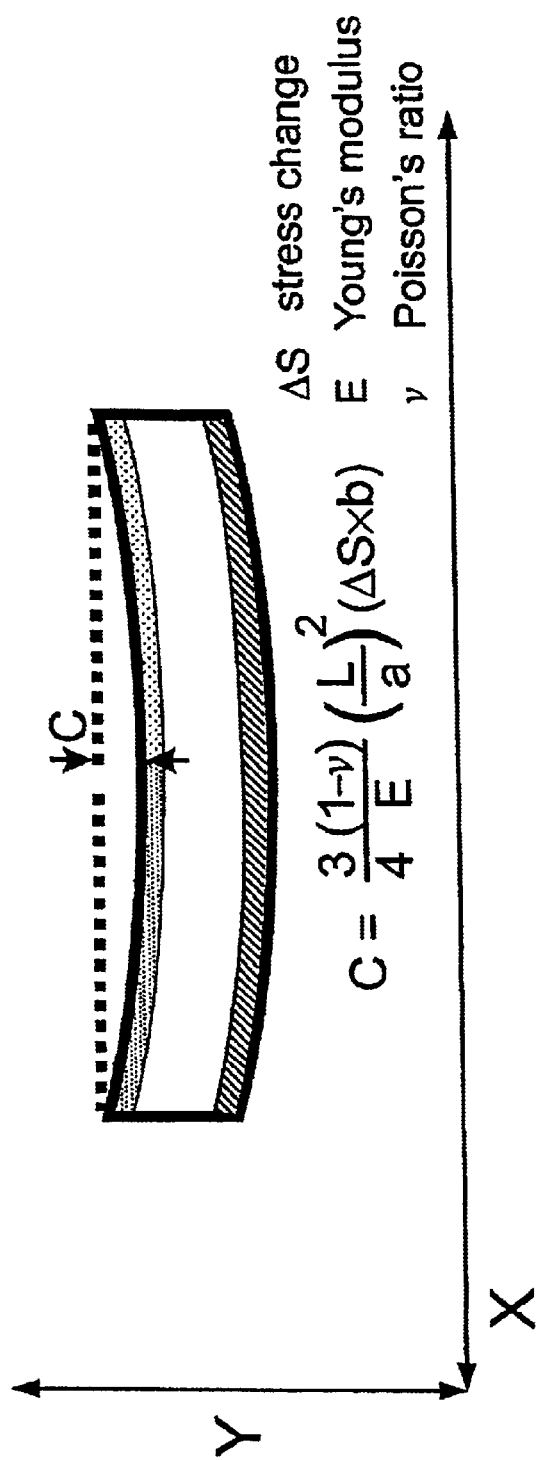

The present invention relates to a method and apparatus for creating very high crown and camber in sliders by creating controlled tensile stress in the flex side of the sliders using variable pulsed laser fluence to melt the slider material without over-heating the sensor in it and without tensile stress relief cracks of controlled or preferred orientation.

The present inventors have found that the production of very precisely controllable crown in slider material is possible by treatment of the flex side of the slider, when a pulsed laser beam is used in accordance with the present invention. The present invention discloses a method of producing very precise and large crown and camber.

It is first preferred for processing of alumina ceramics, that a pulsed laser having a pulse width between 10 nanoseconds ($10 \times 10^{-9}$ secs.) and 1 microsecond ($1 \times 10^{-6}$ secs.) and a repetition rate of 200–300 kHz is used. This is preferred because this range of pulse-widths and repetition rates allows very quick and localized heating of the material at the point of application, limiting the spreading of heat to the surrounding material, which can cause thermal damage to the slider sensors. It also allows melting of material without loss of material through ablation. Continuous wave lasers having application times on the order of milliseconds to seconds are more likely to have damaging effects on the sensitive sensor components, and considered unsuitable for this type of operation. It is of course possible that for other substrate materials, other pulse durations and repetition rates may be preferred, and the method disclosed herein contemplates changes in other parameters to accommodate differences in materials and in batches of materials.

A second parameter of the present invention is the laser fluence. The term "fluence" refers to the surface laser energy density produced by a laser, preferably a pulsed laser, onto a surface area. In the present invention, it is measured in units of energy (or energy/pulse) divided by area. The beam spot size is generally so small, that the fluence will generally lie in the region of Joules/cm$^2$.

Fluence can be adjusted for maximal performance and control in two primary ways. First, the spot size can remain constant while the energy per pulse is varied, or second, the energy can remain constant while the spot size is varied.

The energy per pulse of a laser can be varied by several different methods. The current to the excitation mechanism can be adjusted, which has an effect on the power output of the laser. However, it is usually necessary to monitor changes in power output during such changes, since it cannot be relied upon that a 10% change in current input will directly produce a corresponding 10% change in the laser output. The process is complicated by the fact that changes in current input can also produce changes in pulse-width, which can have other effects on the process.

The energy of the laser can also be varied by attenuating the beam by using filters, or using devices such as a Liquid Crystal Variable Retarder (LCVR), which changes polarization in an active manner. When used with a polarizer, the LCVR can be used to reduce the power output in a somewhat controllable manner, although very fine control in the range of a few percent is still difficult to achieve.

Alternatively, a preferred manner of controlling the fluence of the laser is by controlling the spot size, an operation which can be easily and inexpensively controlled by use of a lens which can be adjusted to move the focal plane relative to the slider material, or by moving the slider piece relative to the focal plane. This method of increasing the spot size is preferred because of its simplicity over the traditional method of using an adjustable beam collimating device to decrease the diameter of the laser beam before the focusing lens, which has the effect of increasing the spot size.

Figure 2:
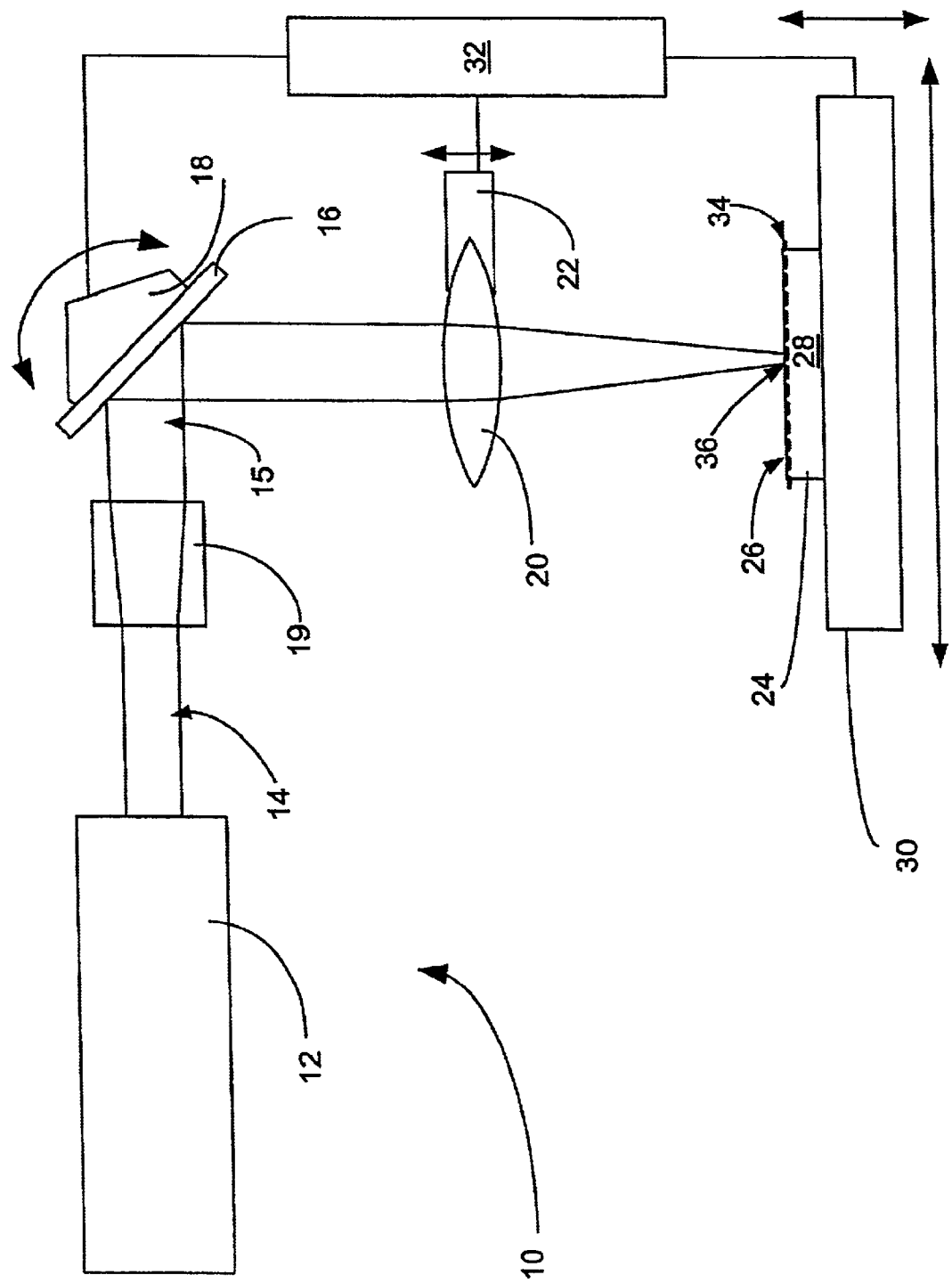
FIG. 2 shows a block diagram side view of a laser system of the present invention.
Figure 3:
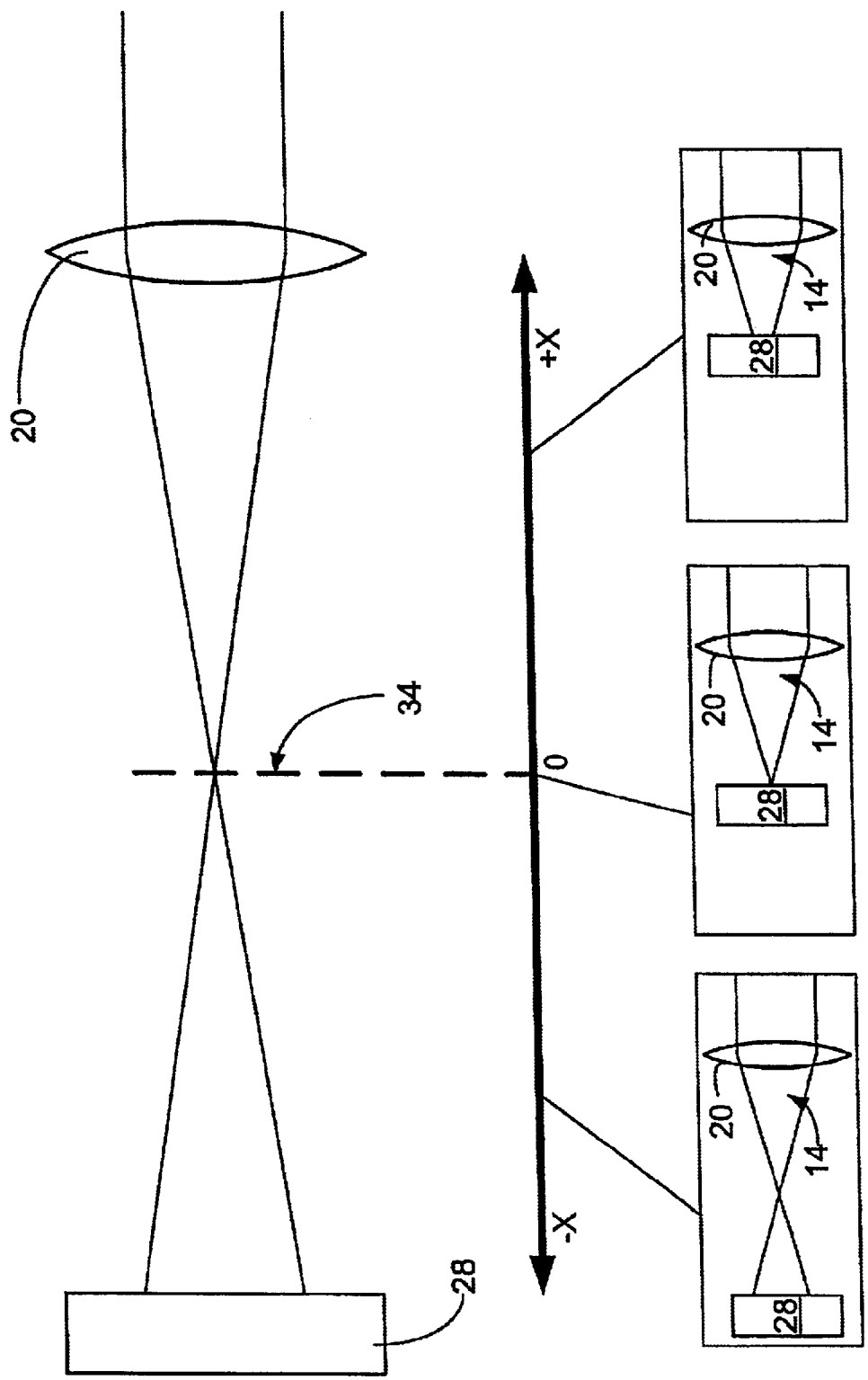
FIG. 3 illustrates a detail view of the focal plane of a laser beam as produced by the laser system of the present invention, and further detail views of the beam as found at three positions relative to the focal plane.

FIG. 2 shows the basic components of the laser processing system 10 of the present invention. A pulsed laser 12 which may be pulsed by a number of mechanisms such as a Q-switch (not shown) produces a laser beam 14 which is preferably reflected from a directing optic such as a movable mirror 16 mounted on a tiltable and/or translatable stage 18. The laser beam may have been conditioned to provide a collimated beam and/or one that has been expanded 15, by an optional beam expander 19. The beam 14 or the expanded beam 15 is then directed by a focusing device such as a lens 20 mounted on a translatable stage 22 which can move the stage vertically as the beam 14 or 15 is focused on the substrate 24 surface, which it will be assumed is the flex side 26 of a slider 28. The slider 28 is placed on a moveable stage 30 which can move in either the horizontal or vertical planes. The movement of movable fixtures, such as the stage 30, lens mount 22 and/or mirror mount 18 are preferably controlled by a computer controller 32. It should be understood that any combination of movable fixtures in this system is possible, so that any or all of the stage 30, lens mount 22 and mirror mount 18 may be moveable, or that only the lens mount 22 or stage 30 may be moveable. The use of a reflecting mirror is also optional, so that the slider 28 could alternately be placed vertically as seen in FIG. 3.

The slider 28 will be assumed to be placed at the focal plane 34 in FIG. 2, to produce a spot 36. This is the point at which the beam 14 is most tightly focused and the spot size will be at a minimum. In terms of fluence, this will present the highest energy concentration per unit area. FIG. 3 shows the effect of moving the slider 28 relative to the focal plane 34. In the −X direction, the slider 28 will be beyond the focal plane 34, the spot size will increase, and the fluence will decrease. In the +X direction, the slider 28 will be before the focal plane 34, and once again, the spot size will be increased and the fluence decreased from that found at the focal plane 34.

In general terms, the lens 20 and lens stage 22, as well as the movable slider stage 30, can be thought of as fluence varying devices, since the spot size, and thus the fluence can be varied through their adjustment. Another way of varying the fluence is by adjusting the power output of the laser, which is typically done by reducing the current to the excitation mechanism (not shown) of the laser. Examples would include decreasing the current to diodes or flashlamps in diode-pumped or flashlamp-pumped lasers, or controlling the voltage to an excimer laser's excitation mechanism.

Figure 4:
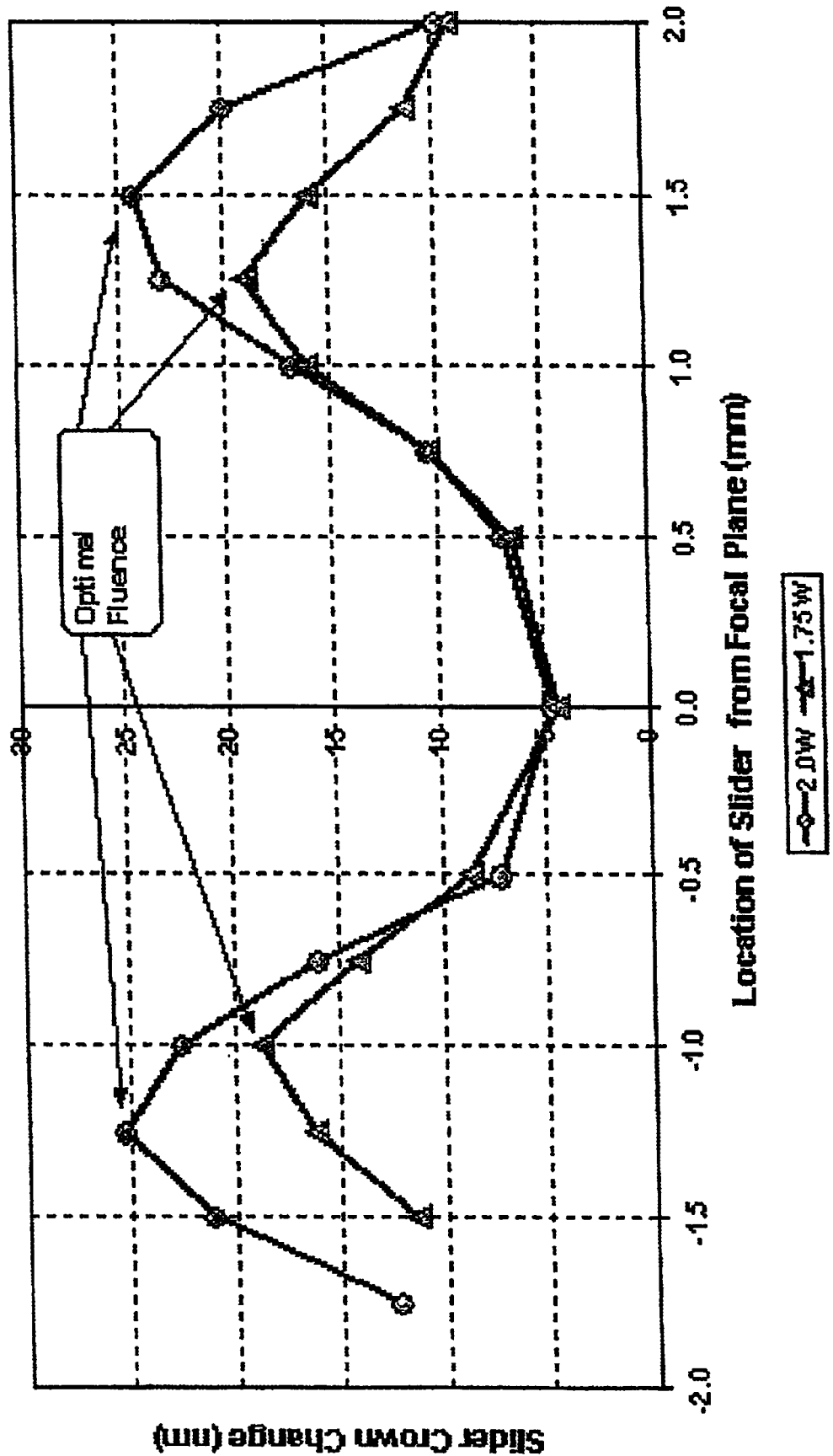
FIG. 4 shows a graph of the effect of varying positional relationship between the slider material and the focal plane of the laser.

FIG. 4 illustrates a chart showing the measured change in crown as a function of slider position with respect to the focal plane, which is identified as 0.0 position, where the spot size is minimum, and the fluence at maximum. The laser used was operated at a 100 kHz repetition rate. Two curves are shown, one representing a 2.0 Watt output shown with circles, and a 1.75 Watt output indicated by triangles. The distances from the focal plane which produced the most change in the slider crown are noted with arrows and marked as "optimal fluence" on the chart. At these-points the performance of the laser system has been optimized so that, for example, for a pulsed laser operating at 100 kHz and producing 2 Watts of power, or 20 micro-joules per pulse, by locating the slider at either −1.25 mm or +1.5 mm from the focal plane, the laser beam will melt the slider material just enough to induce the maximum tension stress, and thus the maximum curvature in the slider material, when it refreezes. The safety of the sensor is also thus assured, because pulses of this duration and energy level will not heat the surrounding substrate so as to cause damage.

Figure 5:
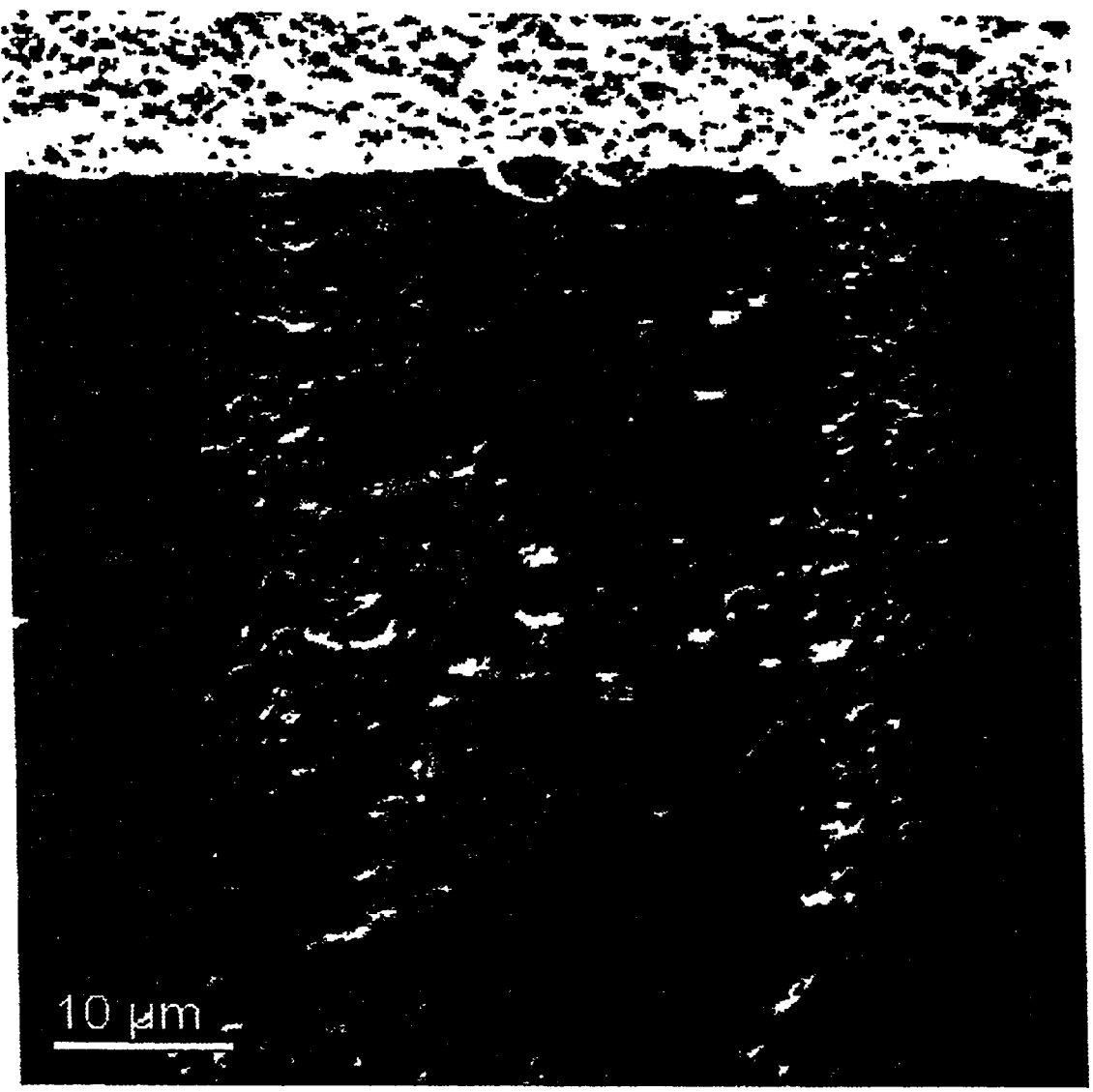
FIG. 5 shows the appearance of the melt with microscopic cracks with no preferred orientation.

The typical appearance of the melt after laser irradiation of the slider material is shown in FIG. 5, which is a scanning electron microscope image of the melt on a slider surface, viewed at an angle of 45 degrees from normal. The top part of the figure, which is the surface orthogonal to the surface which has been melted, shows a cross-section of the melt zone, which is of sub-micron thickness. The micro-cracks do not have particular orientation and are typically sub-micrometers in depth.

Figure 6:
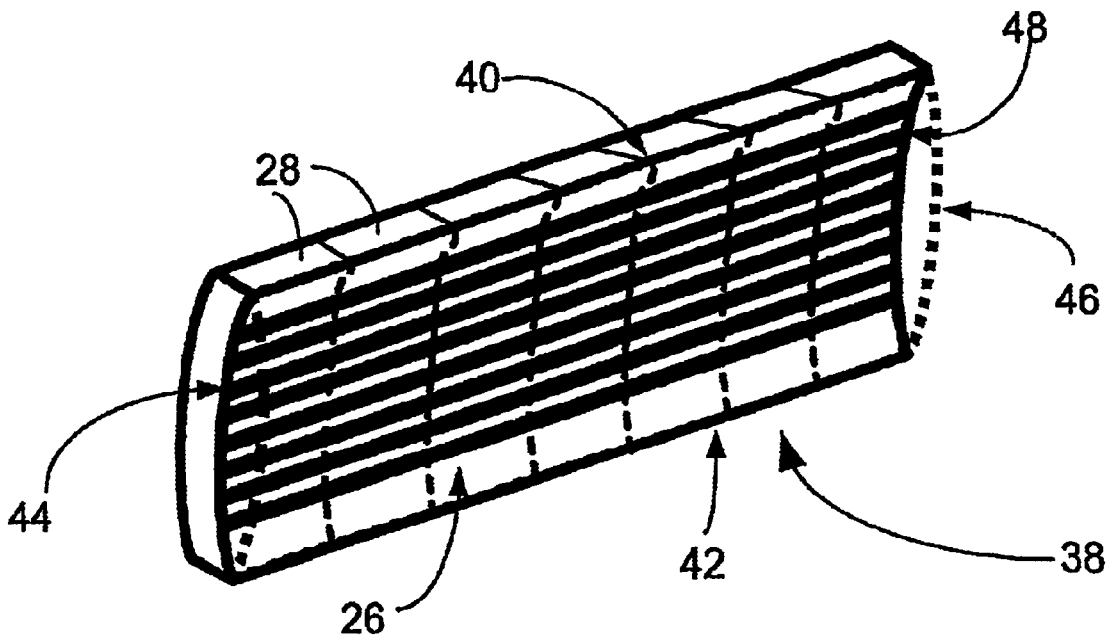
FIG. 6 illustrates the effect of laser scribing as performed by the present invention in changing the crown of a row of sliders.

As defined above, crown is the maximum separation of the cylindrical contour along the flying direction from an imaginary plane drawn between the two end edges, i.e., the leading and trailing edges, of the ABS. Camber is the separation from an imaginary plane drawn between the two side edges of the slider. As shown in FIG. 6, crown 46 is shown being produced in a row of sliders 38 having their leading edges 40 and their trailing edges 42 at the top and bottom respectively of the Figure. The flex sides 26 of the sliders 28 are facing the viewer, and in this orientation, optimized crown is produced by scribing parallel horizontal lines 46. As shown by the dashed line, the row of sliders 38 is assumed to have an initial crown 46 which is negative, i.e. convex as seen by the viewer of the Figure, typically due to unrelieved compressive stress in the material. The final crown 48 is seen to be positive, i.e. concave as seen from the flex side 26.

Figure 7:
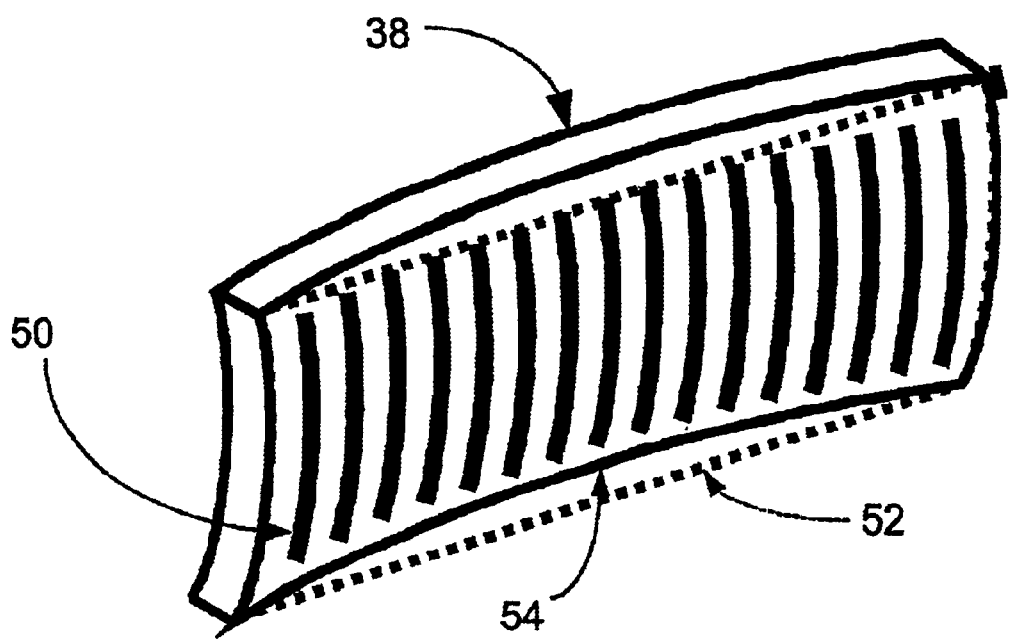
FIG. 7 illustrates the effect of laser scribing as performed by the present invention in changing the camber of a row of sliders.

In a similar way, FIG. 7 shows a row of sliders 38 having vertical scribed lines 50. The initial camber 52 and the final camber 54 are shown as the result of the laser processing.

Figure 8:
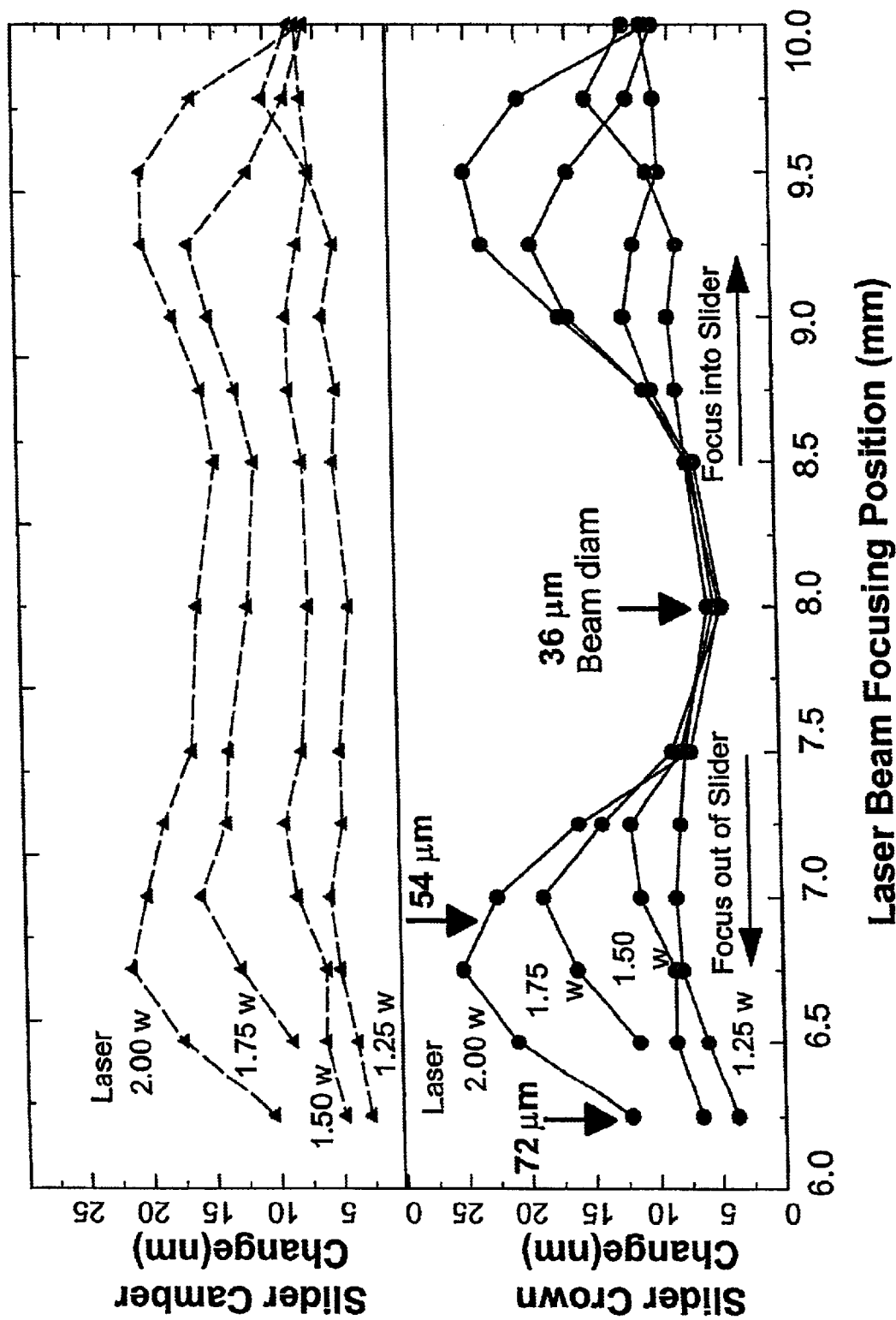
FIG. 8 shows a chart showing the effect of laser beam focusing position on changes in both crown and camber.

FIG. 8 shows a chart of the change in both crown and camber in nanometers and includes the data shown in FIG. 4, plotted against the actual laser beam focusing position. The crown and camber changes are obtained at various laser power levels and for various spot sizes as they are changed from a minimum of $36 \times 10^{-6}$ meter beam diameter at the focal plane, labeled to be at 8.0 mm on the chart. It can be seen that the maximum curvature change corresponding to optimal fluence is found when the slider is positioned at either before or after the position of the focal plane.

In addition to the use of a fundamental laser wavelength from a Nd-doped solid-state laser, it is possible that the laser beam is produced through a process of harmonic generation to yield a wavelength which is absorbed well by the substrate material, as disclosed in pending U.S. patent application Ser. No. 09/444,793, filed Nov. 22, 1999, entitled PROCESSING OF MULTI-PHASE CERAMIC SLIDER MATERIALS USING HARMONICALLY GENERATED ULTRAVIOLET LASER RADIATION.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for producing very high crown and camber curvature in slider materials having a flex side and an air-bearing side using a laser processing system which produces a pulsed laser beam, comprising the steps of:

(A) establishing a focal plane for the laser beam, the laser beam having a pulse width in the range of $1 \times 10^{-9}$ seconds to $1 \times 10^{-3}$ seconds, with an energy per pulse in the range of 1 to 1,000,000 microJoules, and a repetition rate between 1 Hz and 400 kHz;

(B) applying the pulsed laser beam to the flex side of the slider material; and (C) varying the relative positions of the slider material and the focal plane of the laser beam to optimize the curvature.

2. The method of claim 1, wherein the laser processing system further comprises a focusing device, whereby the focal plane of the laser beam is established.

3. The method of claim 2, wherein said focusing device is at least one lens mounted on a moveable stage, whereby the position of the focal plane relative to the slider material can be varied.

4. The method of claim 1, wherein the laser processing system further comprises a movable stage to which the slider material is attached, the position of the slider material relative to the focal plane can be varied.

5. The method of claim 1, wherein the laser is Q-switched.

6. The method of claim 1, wherein the laser beam is conditioned with a beam expander with adjustable beam expansion.

7. The method of claim 1, wherein the laser beam is produced through harmonic generation.

8. The method of claim 1, wherein the laser beam is moved by at least one directing optic.

9. The method of claim 8, wherein at least one directing optic includes at least one reflecting mirror.

10. The method of claim 1, wherein the slider material is one or more rows of sliders.

11. A method for producing very high crown and camber curvature in slider materials having a flex side, using a laser processing system which produces a laser beam which produces fluence which is variable in a controllable manner, comprising the steps of:

(A) applying the laser beam to the flex side of the slider material, the laser beam having a pulse width in the range of $1 \times 10^{-9}$ seconds to $1 \times 10^{-3}$ seconds, with an energy per pulse in the range of 1 to 1,000,000 microJoules, and a repetition rate between 1 Hz and 400 kHz; and (B) varying the fluence of the laser to optimize the curvature in the slider material.

12. The method of claim 11, wherein fluence is controllably varied by changing the power output of the laser.

13. The method of claim 11, wherein fluence is controllably varied by changing the spot size of the laser beam.

14. The method of claim 13, wherein the spot size of the laser beam is varied by changing the relative positions of the slider material and the focal plane of the laser beam.

15. The method of claim 14, wherein the spot size is controllably varied by moving the focal plane of the laser beam relative to the slider material.

16. The method of claim 15, wherein the focal plane of the laser is moved relative to the slider material by using at least one focusing lens which is attached to a movable mount.

17. The method of claim 14, wherein the slider material is moved relative to the focal plane of the laser by using a movable mount to which the slider material is attached.

18. The method of claim 11, wherein fluence is controllably varied by adjusting the beam expansion of the laser beam.

19. The method of claim 11, wherein the slider material is one or more rows of sliders.

* * * * *